(12) United States Patent
Clauzade et al.

(10) Patent No.: US 6,609,551 B2
(45) Date of Patent: Aug. 26, 2003

(54) MOTORCYCLE TIRE HAVING A CROWN REINFORCEMENT WITH A PLY OF CIRCUMFERENTIAL ELEMENTS

(75) Inventors: Catherine Clauzade, Lempdes (FR); Christian Pierre, Beaumont (FR); Alain Valle, Cebazat (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 0 days.

(21) Appl. No.: 09/930,624

(22) Filed: Aug. 15, 2001

(65) Prior Publication Data

US 2002/0100531 A1 Aug. 1, 2002

Related U.S. Application Data

(63) Continuation of application No. PCT/EP99/07183, filed on Sep. 28, 1999.

(30) Foreign Application Priority Data

Feb. 19, 1999 (FR) .............................. 99 02146

(51) Int. Cl.⁷ .............................. B60C 9/18; B60C 9/22
(52) U.S. Cl. .................. 152/526; 152/531; 152/535
(58) Field of Search .................. 152/526, 529, 152/531, 533, 535, 536

(56) References Cited

U.S. PATENT DOCUMENTS 4,402,356 A * 9/1983 Musy .......................... 152/193
5,301,730 A   4/1994 Delias ......................... 152/531
5,339,878 A   8/1994 Takase ......................... 152/527
5,385,193 A   1/1995 Suzuki et al. ................ 152/525
5,529,102 A   6/1996 Watkins et al. .............. 152/454

FOREIGN PATENT DOCUMENTS

| EP | 0635383 | | 1/1995 |
| GB | 2157239 | | 10/1985 |
| JP | 56071605 | * | 6/1981 |
| JP | 05213005 | * | 8/1993 |
| JP | 10053007 | * | 2/1998 |
| JP | 10181310 | * | 7/1998 |

* cited by examiner

*Primary Examiner*—Michael W. Ball
*Assistant Examiner*—Justin Fischer

(57) ABSTRACT

A motorcycle tire including a highly convex tread joined by two sidewalls of low height to two beads, each bead being reinforced by an inextensible annular element around which is anchored a carcass reinforcement formed of textile reinforcement elements forming with the circumferential direction an angle of between 70° and 90°, the carcass reinforcement being radially surmounted by a crown reinforcement formed of at least one ply of circumferential reinforcement elements, located radially between the carcass reinforcement and the radially outermost ply of the crown reinforcement, and of two plies of elements of textile material, which are crossed from one ply to the next and forming with the circumferential direction angles of between 65° and 85°.

5 Claims, 1 Drawing Sheet

MOTORCYCLE TIRE HAVING A CROWN REINFORCEMENT WITH A PLY OF CIRCUMFERENTIAL ELEMENTS

This is a continuation of pending PCT/EP 99/07183, filed Sep. 28, 1999.

BACKGROUND OF THE INVENTION

The present invention relates to a tire intended to be mounted on a two-wheeled vehicle and more particularly a motorcycle.

As in the case of all other tires, radialization of motorcycle tires is taking place, the architecture of such tires comprising a carcass reinforcement formed of one or two plies of reinforcement elements forming with the circumferential direction an angle which may be between 75° and 90°, said carcass reinforcement being radially surmounted by a crown reinforcement formed at least of generally textile reinforcement elements.

Numerous crown reinforcement architectures have been proposed, depending on whether the tire is intended to be mounted at the front or the rear of the motorcycle. A first structure consists, for said crown reinforcement, of using solely circumferential cables, and said structure is more particularly used for the rear position. A second structure, directly inspired by the structures commonly used for tires for passenger cars, has been used to improve the wear resistance, and consists in using at least two crown plies of reinforcement elements which are parallel to each other within each ply but are crossed from one ply to the next, forming acute angles with the circumferential direction, such tires being particularly suited for the front of motorcycles. Said two crown plies may be surmounted radially by at least one ply of circumferential elements, which are generally obtained by helical winding of a strip of at least one reinforcement element coated with rubber. French Patent 2 561 588 describes such a crown reinforcement, with at least one ply, the reinforcement elements of which form with the circumferential direction an angle which may vary between 0° and 8°, the elasticity modulus of such elements being at least 6000 N/mm², and, arranged between the carcass reinforcement and the ply of circumferential elements, a shock-absorbing layer formed mainly of two plies of elements which are crossed from one ply to the next, forming between them angles of between 60° and 90°, said crossed plies being formed of textile reinforcement elements having an elasticity modulus of at least 6000 N/mm².

In order to impart to a motorcycle tire excellent stability at high speed and excellent contact properties with the ground, EP 0 456 933 A1 teaches producing a crown reinforcement with at least two plies: a first ply, radially closest to the carcass reinforcement being composed of cables oriented at an angle of between 40° and 90° relative to the circumferential direction and the second ply, radially closest to the tread, being composed of cables wound in a helix in the circumferential direction.

U.S. Pat. No. 5,529,102 describes a motorcycle tire having crown plies which are formed of elements crossed at an angle between 16° and 30° and surmounted by a ply of reinforcement elements of aliphatic polyamide which may be radial. In order to increase the drive ability of a tire for the rear position of a motorcycle, U.S. Pat. No. 5,301,730 proposes a crown reinforcement composed, from the radial carcass reinforcement to the tread, of at least one ply of substantially circumferential elements and of two plies of elements which are crossed from one ply to the next, forming with the circumferential direction an angle which may be between 35° and 55°, the ply of elements which are parallel to the circumferential direction being formed of elements of aromatic polyamide, and the plies of crossed elements of aliphatic polyamide.

Such tires make it possible, in addition to increasing drive ability, to preserve good speed properties, which makes said tires particularly suitable for sports competitions on a competition circuit. On the other hand, the use of aromatic polyamide as the material of the reinforcement elements of the two crossed plies in the crown reinforcement for motorcycles does not make it possible to obtain endurance of said crown reinforcement which is compatible with prolonged use on the road: the crossed reinforcement elements do not resist fatigue and the number of cycles effected being insufficient without it being possible to state the causes of such degeneration.

SUMMARY OF THE INVENTION

The object of the invention is to overcome such drawbacks by improving the endurance of motorcycle tires, without sacrificing the other properties which are necessary for satisfactory travelling on roads.

According to the invention, a motorcycle tire comprising a highly convex tread, joined by two sidewalls of low height to two beads, each bead being reinforced by an inextensible annular element around which is anchored a carcass reinforcement formed of textile reinforcement elements forming with the circumferential direction an angle of between 70° and 90°, said carcass reinforcement being radially surmounted by a crown reinforcement formed of at least one ply of circumferential reinforcement elements, and two plies of reinforcement elements of textile material which are crossed from one ply to the next, forming with the circumferential direction angles of between 65° and 85°, characterized in that said crossed elements are cables of aliphatic polyamide or polyester, the elasticity modulus of which is greater than 1,500 MPa, the circumferential elements being cables of aromatic polyamide, the elasticity modulus in tension of which is at least 10,000 MPa, the ply of circumferential elements being located radially between the carcass reinforcement and the two plies of crossed elements.

Reinforcement elements are said to be circumferential if they form an angle of between −5° and +5° with the circumferential direction.

"Elasticity modulus" of a reinforcement element refers to the modulus under tension of a reinforcement element taken from the vulcanized tire, said modulus being a secant modulus measured for a relative elongation of between 1% and 5%.

The characteristics and advantages of the invention will be explained more precisely in the following description, which refers to the accompanying drawing which illustrates an embodiment of the invention in an non-limitative manner.

DESCRIPTION OF PREFERRED EMBODIMENTS

Figure 1:
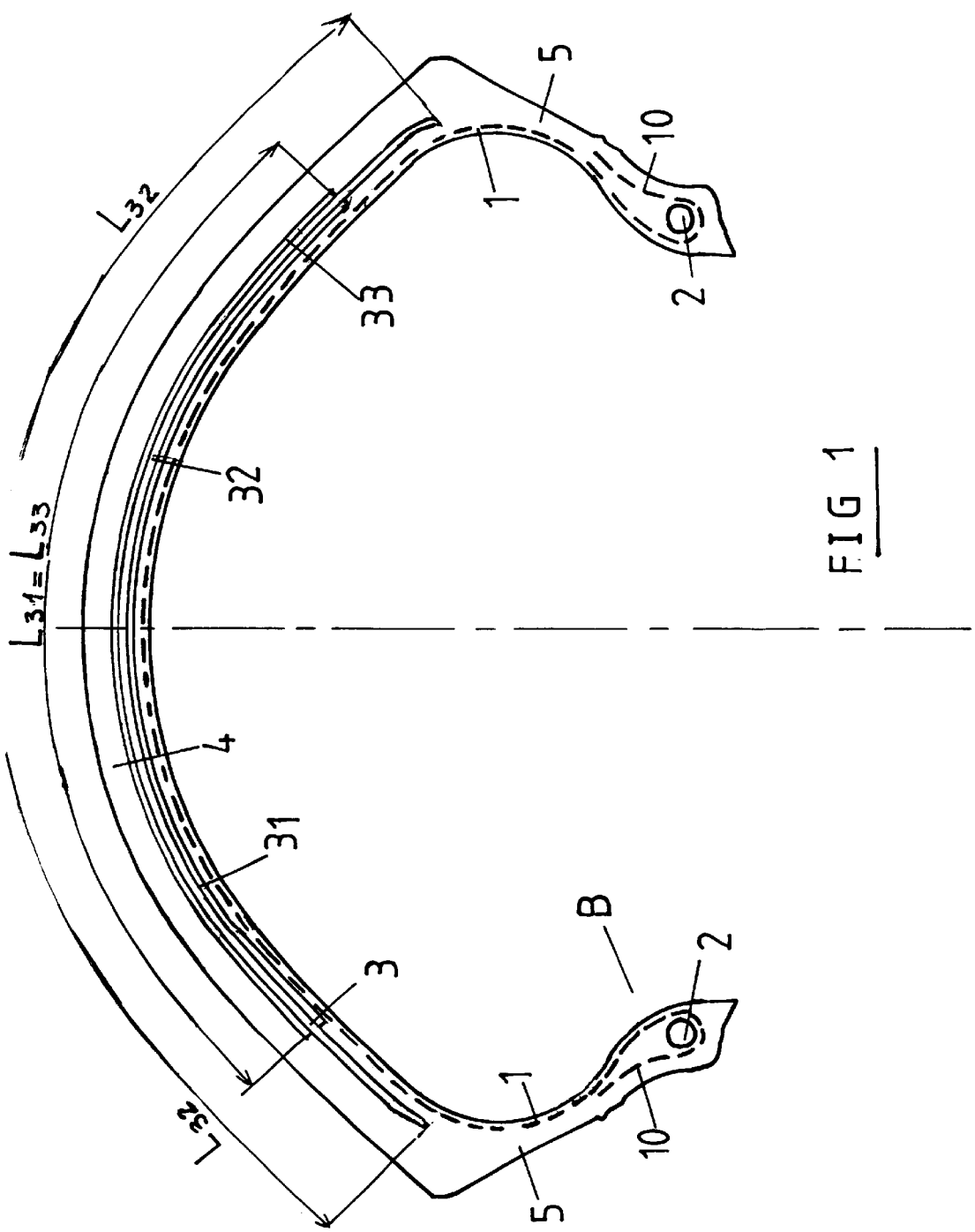
FIG. 1 is a sectional view of a tire embodying the present invention.

The tread 4 of the tire of dimension 180/55 ZR 17 for the rear position of a motorcycle is greatly rounded and is joined to two beads B by means of two sidewalls 5. Each bead B is reinforced by a bead wire 2, around which there is anchored by winding a carcass reinforcement 1 formed of a single ply of radial cables of aliphatic polyamide, forming upturns 10. Said radial carcass reinforcement 1 is radially surmounted by a crown reinforcement 3, formed of three plies 31, 32, 33. The ply 31 radially closest to the axis of rotation of the tire is a ply of 167/2 cables which are on one hand of aromatic polyamide and on the other hand virtually circumferential, the very small angle formed by said cables with the circumferential direction being due to the fact that said ply 31 is obtained by helical winding of the cables. Radially to the outside of the ply 31, there are arranged two plies 32, 33 of cables of aliphatic polyamide, which are parallel to each other within each ply 32, 33 and are crossed from one ply 32 to the next 33, forming with the circumferential direction angles $\alpha$ and $\beta$, which are equal to each other in the case described and to 75°, said angles possibly in fact being slightly different from each other. The respective widths $L_{31}$, $L_{32}$, $L_{33}$ of the crown plies 31, 32, 33 are equal to 198 mm, 210 mm and 198 mm (the widths measured being developed widths).

The tire according to the invention, as described above, was compared in various tests on one hand with a tire of the same constitution but the two crossed plies of which were formed of cables forming an angle of 45° with the circumferential direction, and on the other hand with a tire, the crown reinforcement of which comprises only one ply of circumferential elements, commonly used at the rear of a motorcycle. The various criteria observed are evaluated either by objective measurement or by subjective appreciation: be it measurement or appreciation, the mark 100 is assigned to the control tire, the crown plies of which are at 45°, the mark obtained by the tire of the invention and/or the conventional tire being lower if said tire proves inferior to the control tire and higher if said tire is superior to the control tire. The tests are first of all conducted with the same front tire and the comparisons between the three tires are made at the rear of the motorcycle. Table I below summarises said first tests.

|  | STABILITY | | | WEAR | |
|---|---|---|---|---|---|
|  | IN A STRAIGHT LINE | ON A CURVE | CIRCUIT COMPRISING BENDS | ENDURANCE NUMBER OF CYCLES | COMFORT |
| 90°/0° | 160 | 70 | 78 | 200 | 150 |
| 90°/0°/45°/45° | 100 | 100 | 100 | 100 | 100 |
| 90°/0°/75°/75° | 140 | 95 | 100 | 190 | 140 |

As can be noted, the endurance of the tire according to the invention is very significantly improved (doubled) and proves equivalent to the endurance obtained with a conventional rear tire, while having, relative to the latter, an enormous advantage in terms of wear on a circuit comprising bends. Furthermore, and unexpectedly, the tire according to the invention has a certain advantage in terms of stability in a straight line while retaining good stability on curves, which stability in a straight line is judged by damping of the tacking of the motorcycle after excitation of the ground or the rider. It also has a not inconsiderable advantage in terms of comfort, which is judged above all by the vibrations, feedback of information coming from the ground, felt by the rider at the handlebars or at the saddle of the motorcycle. Said advantages are achieved without any loss of high-speed road-holding.

A tire according to the invention was tried at the front of the vehicle, the rear hub being fitted with a conventional rear tire, referred to as a (90°/0°) tire, and was compared on one hand with a tire commonly used on the front of a motorcycle, that is to say a tire, the crown reinforcement of which is composed of two plies, the reinforcement elements of said two plies being oriented respectively relative to the circumferential direction at angles of 25°/25°, and on the other hand to what is called a 90°/0° tire. Table II below summarises the results obtained, the criteria for judgement obviously being different as far as the subjective tests are concerned:

|  | STABILITY ACCURACY OF TRAJECTORY | COMFORT HANDLEBAR VIBRATIONS | WEAR |
|---|---|---|---|
| 90°/0° | 60 | 200 | 50 |
| 90°/25°/25° | 100 | 100 | 100 |
| 90°/0°/75°/75° | 90 | 180 | 90 |

The tire according to the invention, when mounted at the front, therefore unexpectedly provides substantial improvement, which is particularly appreciated in terms of comfort: in particular, the rider feels practically no rotational vibrations in the handlebars or shimmy, which vibrations make riding very dangerous and difficult, whereas the wear resistance is not adversely affected and the road-holding at high speed is improved.

The combination of characteristics of the tires according to the invention results in a compromise of properties which is more suitable to on-road use, without adversely affecting the performance of this type of crown architecture in terms of wear resistance and road-holding at high speed.

We claim:

1. A motorcycle tire comprising a highly convex tread joined by two sidewalls of low height to two beads, each bead being reinforced by an inextensible annular element around which is anchored a carcass reinforcement formed of textile reinforcement elements forming with the circumferential direction an angle of between 70° and 90°, said carcass reinforcement being radially surmounted by a crown reinforcement formed of at least one ply of circumferential reinforcement elements and of two plies of reinforcement elements of textile material which are crossed from one ply to the next, wherein one of the plies of crossed reinforcement elements is a radially outermost ply of the crown reinforcement, the at least one ply of circumferential reinforcement elements being located radially between the carcass reinforcement and the two plies of crossed reinforcement elements) wherein said crossed reinforcement elements form with the circumferential direction angles of between 65° and 85°.

2. A tire according to claim 1, wherein the crossed reinforcement elements are cables having an elasticity modulus greater than 1,500 MPa.

3. A tire according to claim 1, wherein the circumferential reinforcement elements are cables having an elasticity modulus in tension of at least 10,000 MPa.

4. A tire according to claim 1, wherein the crossed reinforcement elements are cables of aliphatic polyamide or polyester.

5. A tire according to claim 1, wherein the circumferential reinforcement elements are cables of aromatic polyamide.

* * * * *

UNITED STATES PATENT AND TRADEMARK OFFICE
CERTIFICATE OF CORRECTION

PATENT NO. : 6,609,551 B2  Page 1 of 1
DATED : August 26, 2003
INVENTOR(S) : Clauzade et al.

It is certified that error appears in the above-identified patent and that said Letters Patent is hereby corrected as shown below:

Column 1,
Line 62, "drive ability" should read -- driveability --

Column 2,
Lines 6-7, "drive ability" should read -- driveability --

Column 4,
Line 65, "elements)" should read -- elements, --

Signed and Sealed this

Ninth Day of December, 2003

JAMES E. ROGAN
*Director of the United States Patent and Trademark Office*